US011164454B2

(12) United States Patent
Silver et al.

(10) Patent No.: US 11,164,454 B2
(45) Date of Patent: *Nov. 2, 2021

(54) DETECTING AND RESPONDING TO SIRENS

(71) Applicant: Waymo LLC, Mountain View, CA (US)

(72) Inventors: David Harrison Silver, Millbrae, CA (US); Angus Leigh, Mountain View, CA (US); Benjamin Ingram, Santa Clara, CA (US); Jennifer Taylor, Palo Alto, CA (US); Vaibhav Nangia, East Palo Alto, CA (US)

(73) Assignee: WAYMO LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,928

(22) Filed: Apr. 9, 2020

(65) Prior Publication Data

US 2020/0234579 A1 Jul. 23, 2020

Related U.S. Application Data

(63) Continuation of application No. 16/392,745, filed on Apr. 24, 2019, now Pat. No. 10,650,677, which is a
(Continued)

(51) Int. Cl.
*G08G 1/0965* (2006.01)
*H04R 3/00* (2006.01)
(Continued)

(52) U.S. Cl.
CPC ......... *G08G 1/0965* (2013.01); *G06F 16/683* (2019.01); *G06F 16/686* (2019.01);
(Continued)

(58) Field of Classification Search
None
See application file for complete search history.

(56) References Cited

U.S. PATENT DOCUMENTS 3,691,559 A 9/1972 Jackson
4,212,085 A * 7/1980 Vaillancour ........... G01S 3/8034
367/124
(Continued)

FOREIGN PATENT DOCUMENTS

DE 102010022165 A1 1/2011
GB 2509343 A 7/2014
(Continued)

OTHER PUBLICATIONS

Japanese Office Action for Application No. 2019-565175 dated Jan. 5, 2021.
(Continued)

*Primary Examiner* — Chico A Foxx
(74) *Attorney, Agent, or Firm* — Botos Churchill IP Law LLP

(57) ABSTRACT

The technology relates to detecting and responding to emergency vehicles. This may include using a plurality of microphones to detect a siren noise corresponding to an emergency vehicle and to estimate a bearing of the emergency vehicle. This estimated bearing is compared to map information to identify a portion of roadway on which the emergency vehicle is traveling. In addition, information identifying a set of objects in the vehicle's environment as well as characteristics of those objects is received from a perception system is used to determine whether one of the set of objects corresponds to the emergency vehicle. How to respond to the emergency vehicle is determined based on the estimated bearing and identified road segments and the determination of whether one of the set of objects corre-
(Continued)

sponds to the emergency vehicle. This determined response is then used to control the vehicle in an autonomous driving mode.

20 Claims, 10 Drawing Sheets

Related U.S. Application Data continuation of application No. 15/689,336, filed on Aug. 29, 2017, now Pat. No. 10,319,228.

(60) Provisional application No. 62/525,423, filed on Jun. 27, 2017.

(51) Int. Cl.
*G08G 1/16* (2006.01)
*G06F 16/683* (2019.01)
*G06F 16/68* (2019.01)
*G08G 1/0962* (2006.01)

(52) U.S. Cl.
CPC ............. *G08G 1/166* (2013.01); *H04R 3/005* (2013.01); *G08G 1/09623* (2013.01); *G08G 1/09626* (2013.01); *H04R 2499/13* (2013.01)

(56) References Cited

U.S. PATENT DOCUMENTS

| | | | |
|---|---|---|---|
| 6,362,749 B1 | 3/2002 | Brill | |
| 7,057,528 B1 | 6/2006 | Ewing et al. | |
| 7,616,128 B2 | 11/2009 | Ohno et al. | |
| 7,675,431 B1* | 3/2010 | Caouette, Sr. | G08G 1/0965 340/902 |
| 8,094,040 B1* | 1/2012 | Cornett | G08G 1/087 340/902 |
| 8,838,321 B1 | 9/2014 | Ferguson | |
| 9,103,903 B2 | 8/2015 | Funayama et al. | |
| 9,249,742 B2 | 2/2016 | Sangameswaran et al. | |
| 9,278,689 B1 | 3/2016 | Delp | |
| 9,305,223 B1 | 4/2016 | Ogale et al. | |
| 9,397,630 B2 | 7/2016 | Wang et al. | |
| 9,544,692 B2* | 1/2017 | Hui | G10K 11/17837 |
| 9,704,397 B1 | 7/2017 | Bjorklund et al. | |
| 9,751,463 B1 | 9/2017 | Ramcharitar et al. | |
| 10,051,599 B2 | 8/2018 | Lowe et al. | |
| 10,109,190 B1* | 10/2018 | Baptiste | G08G 1/0965 |
| 10,127,818 B2 | 11/2018 | Mandeville-Clarke | |
| 10,284,317 B1 | 5/2019 | Sanchez et al. | |
| 2001/0002467 A1 | 5/2001 | Ogo | |
| 2001/0007969 A1 | 7/2001 | Mizushima | |
| 2002/0008635 A1 | 1/2002 | Ewing et al. | |
| 2003/0191640 A1 | 10/2003 | Gemello et al. | |
| 2004/0071046 A1 | 4/2004 | Kervern et al. | |
| 2008/0133223 A1 | 6/2008 | Son et al. | |
| 2008/0150755 A1 | 6/2008 | Van et al. | |
| 2009/0179774 A1 | 7/2009 | Mohan et al. | |
| 2009/0322559 A1* | 12/2009 | Yen | G08G 1/0965 340/901 |
| 2010/0228482 A1 | 9/2010 | Yonak | |
| 2010/0253597 A1 | 10/2010 | Seder et al. | |
| 2011/0175755 A1* | 7/2011 | Yoshioka | G08G 1/166 340/995.1 |
| 2012/0306664 A1 | 12/2012 | Geter | |
| 2013/0049985 A1 | 2/2013 | Eisenson et al. | |
| 2013/0154875 A1 | 6/2013 | Sierwald | |
| 2013/0303910 A1 | 11/2013 | Hubbard et al. | |
| 2014/0098964 A1* | 4/2014 | Rosea | H04R 3/005 381/56 |
| 2014/0136096 A1 | 5/2014 | Funayama et al. | |
| 2014/0241126 A1 | 8/2014 | Funayama et al. | |
| 2015/0036832 A1 | 2/2015 | Usher et al. | |
| 2015/0073662 A1 | 3/2015 | Schmüdderich et al. | |
| 2016/0070788 A1 | 3/2016 | Vrazic | |
| 2017/0028850 A1 | 2/2017 | Miller et al. | |
| 2017/0092256 A1 | 3/2017 | Ebenezer | |
| 2017/0174262 A1 | 6/2017 | Kobayashi et al. | |
| 2017/0249839 A1 | 8/2017 | Becker et al. | |
| 2018/0033300 A1 | 2/2018 | Hansen | |
| 2018/0072222 A1 | 3/2018 | Herbert | |
| 2018/0132052 A1 | 5/2018 | Muench et al. | |
| 2018/0156893 A1 | 6/2018 | Kotake et al. | |
| 2018/0211528 A1 | 7/2018 | Seifert | |
| 2018/0237033 A1* | 8/2018 | Hakeem | B60W 50/16 |
| 2018/0302738 A1* | 10/2018 | Di Censo | G06F 3/165 |
| 2018/0364732 A1* | 12/2018 | Yaldo | G08G 1/0965 |
| 2019/0027032 A1 | 1/2019 | Arunachalam | |
| 2019/0035268 A1* | 1/2019 | Madigan | G08G 1/005 |
| 2019/0246225 A1* | 8/2019 | Wacquant | H04R 27/00 |
| 2019/0280664 A1* | 9/2019 | Kawauchi | G08G 1/0962 |
| 2019/0294169 A1* | 9/2019 | Shabtai | G08G 1/166 |
| 2020/0031337 A1* | 1/2020 | Soltanian | B60W 30/0956 |

FOREIGN PATENT DOCUMENTS

| | | |
|---|---|---|
| JP | 2001155259 A | 6/2001 |
| JP | 2007050724 A | 3/2007 |
| JP | 2010067164 A | 3/2010 |
| JP | 2014206804 A | 10/2014 |
| JP | 2015022453 A | 2/2015 |
| WO | 2017151937 A1 | 9/2017 |

OTHER PUBLICATIONS

International Search Report and Written Opinion for PCT Application No. PCT/US2018/039496, dated Oct. 18, 2018. 14 pages.
RESNA 26th International Annual Conference, Technology & Disability: Research, Design, Practice & Policy, 2003, 6 pages.
"Kalman_Filter", <https://en.wikipedia.org/wiki/Kalman_filter>, Downloaded on Jun. 26, 2017, 29 pges.
"Precision and recall", <https://en_wikipedia_org/wiki/Precision_and_recall> , Downloaded on Jun. 26, 2017, 8 pages.
"Precision Time Protocol", <https://en.wikipedia.org/wiki/Precision_Time_Protocol>, Downloaded on Jun. 26, 2017, 8 pages.
"Radar Tracker", <https://en.wikipedia.org/wiki/Radar_tracker>, Downloaded on Jun. 26, 2017, 6 pages.
"Statistical Classification", <https://en.wikipedia.org/wiki/Statistical_classification>, Downloaded on Jun. 26, 2017, 6 pages.
Bendler , et al., "Emergency Vehicle Detector", ECE4007 Senior Design Project, Sep. 15, 2008, 16 pages.
Knapp , et al., "The Generalized Correlation Method for Estimation of Time Delay", IEEE Transactions on Acoustic, Speech and Signal Processing, vol. Assp-24, No. 4, Aug. 1976.
Severdaks , et al., "Vehicle Counting and Motion Direction Detection Using Microphone Array", Elektronika Ir Elektrotechnika 2013, 4 pages.
Final Notice of Reasons for Rejection for Japanese Patent Application No. 2019-565175, dated Jul. 29, 2021.

* cited by examiner

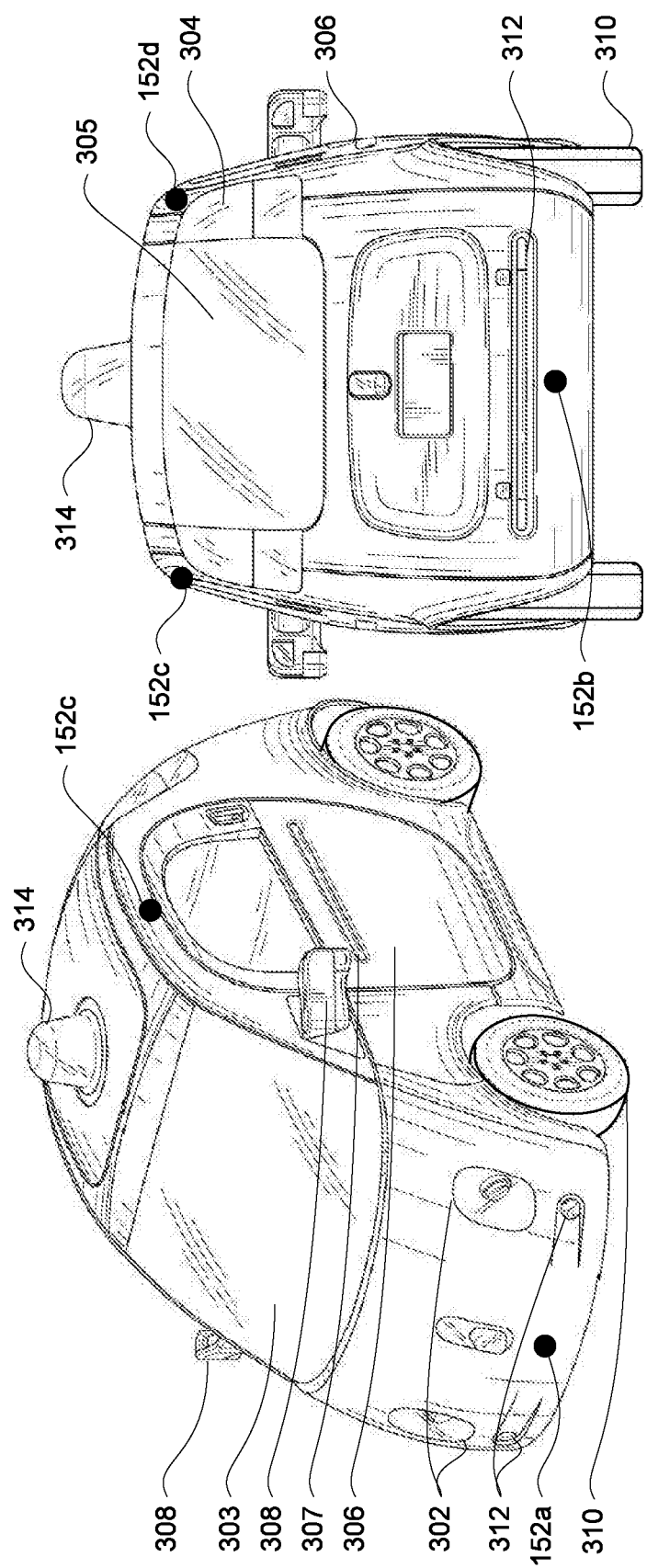

DETECTING AND RESPONDING TO SIRENS

CROSS-REFERENCE TO RELATED APPLICATIONS

The present application is a continuation of U.S. patent application Ser. No. 16/392,745, filed Apr. 24, 2019, which is a continuation of U.S. patent application Ser. No. 15/689,336, filed Aug. 29, 2017, now issued as U.S. Pat. No. 10,319,228, which claims the benefit of the filing date of U.S. Provisional Patent Application No. 62/525,423, filed Jun. 27, 2017, the entire disclosures of which are incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

In order to do so safely, these vehicles must be able to detect and identify objects in the environment as well as respond to them quickly. This is especially true in situations involving emergency vehicles. To detect such vehicles using visual cues can be extremely difficult, especially as these vehicles can differ dramatically, and in many situations may actually resemble non-emergency vehicles. Moreover, if flashing lights are not readily discernable by the autonomous vehicle's perception system, such as when an emergency vehicle is occluded or out of range of the vehicle's perception system, detection can be nearly impossible. One common feature of emergency vehicles are the use of sirens to signal an emergency or a need for the emergency vehicles to pass through traffic quickly. However, in some cases, an emergency vehicle may not be directly observed or identified, even where its presence is identified through its siren. In such cases, it is critical for the autonomous vehicle's reaction that the inferring the emergency vehicle's position, bearing, velocity, and intent through detection and tracking of the siren.

BRIEF SUMMARY

One aspect of the disclosure provides a method of detecting and responding to emergency vehicles. The method includes using, by one or more processors, a plurality of microphones arranged at different locations on a vehicle to detect a siren noise corresponding to an emergency vehicle; using, by the one or more processors, output from the plurality of microphones to estimate a bearing of the emergency vehicle; comparing, by the one or more processors, the estimated bearing to map information identifying locations of roadways subdivided into road segments in order to identify one or more road segments which the emergency vehicle is traveling; determining, by the one or more processors, how to respond to the emergency vehicle based on the estimated bearing and the identified one or more road segments; and controlling, by the one or more processors, the vehicle in an autonomous driving mode based on the determination of how to respond to the emergency vehicle.

In one example, the method also includes using output from the plurality of microphones, estimating a range of the emergency vehicle and wherein determining how to respond to the emergency vehicle is further based on the estimated range. In this example, the method also includes using output from the plurality of microphones over time, estimating a velocity of the emergency vehicle and wherein determining how to respond to the emergency vehicle is further based on the estimated relative velocity. In another example, the method also includes using output from the plurality of microphones over time, estimating a velocity of the emergency vehicle and wherein determining how to respond to the emergency vehicle is further based on the estimated relative velocity. In another example, controlling the vehicle includes changing from a first lane to a second lane. In another example, controlling the vehicle includes pulling the vehicle over onto a shoulder area. In another example, controlling the vehicle includes continuing on a current trajectory of the vehicle. In another example, controlling the vehicle further includes decreasing a speed of the vehicle.

Another aspect of the disclosure provides a method of detecting and responding to emergency vehicles. The method includes using, by one or more processors, a plurality of microphones arranged at different locations on a vehicle to detect a siren noise corresponding to an emergency vehicle; using, by the one or more processors, output from the plurality of microphones to estimate a bearing of the emergency vehicle; receiving, from a perception system of the vehicle, information identifying a set of objects in the vehicle's environment as well as characteristics of the set of objects; determining, by the one or more processors, whether one of the set of objects corresponds to the emergency vehicle based on the characteristics of the set of objects; determining, by the one or more processors, how to respond to the emergency vehicle based on the estimated bearing and the determination of whether the one of the set of objects corresponds to the emergency vehicle; and controlling, by the one or more processors, the vehicle in an autonomous driving mode based on the determination of how to respond to the emergency vehicle.

In one example, the characteristics include an estimated object position, and determining whether one of the set of objects corresponds to the emergency vehicle is further based on a comparison between the characteristics of the set of objects and the estimated bearing. In another example, the method also includes using output from the plurality of microphones over time, estimating a range of the emergency vehicle, and wherein the characteristics include an estimated object position, and determining whether one of the set of objects corresponds to the emergency vehicle is further based on a comparison between the characteristics of the set of objects and the estimated range. In another example, the method also includes using output from the plurality of microphones over time, estimating a velocity of the emergency vehicle, and wherein the characteristics include an estimated object velocity, and determining whether one of the set of objects corresponds to the emergency vehicle is further based on a comparison between the characteristics of the set of objects and the estimated relative velocity. In another example, the method also includes comparing, by the one or more processors, the estimated bearing to map information identifying locations of roadways subdivided into road segments in order to identify one or more road segments which the emergency vehicle is traveling, and wherein determining how to respond to the emergency vehicle is further based on the estimated bearing and the identified one or more road segments. In another example, the method also includes identifying a first likelihood that each given object of the set of objects is the emergency vehicle based on the characteristics of that given object, and wherein determining whether one of the set of objects corresponds to the emergency vehicle is further based on any first likelihoods. In another example, the method also includes identifying a second likelihood that each given object of the set of objects is not the emergency vehicle based on the characteristics of that given object, and wherein determining whether one of the set of objects corresponds to the emergency vehicle is further based on any second likelihoods. In another example, the method also includes controlling the vehicle includes stopping at an intersection when the vehicle would otherwise have right of way to proceed through the intersection.

A further aspect of the disclosure provides a system for detecting and responding to emergency vehicles. The system includes one or more processors configured to use a plurality of microphones arranged at different locations on a vehicle to detect a siren noise corresponding to an emergency vehicle; use output from the plurality of microphones over time, estimating a bearing of the emergency vehicle; compare the estimated bearing to map information identifying locations of roadways subdivided into road segments in order to identify one or more road segments which the emergency vehicle is traveling; receive, from a perception system of the vehicle, information identifying a set of objects in the vehicle's environment as well as characteristics of the set of objects; determine whether one of the set of objects corresponds to the emergency vehicle based on the characteristics of the set of objects; determine how to respond to the emergency vehicle based on the estimated bearing and the identified one or more road segments and the determination of whether one of the set of objects corresponds to the emergency vehicle; and control the vehicle in an autonomous driving mode based on the determination of how to respond to the emergency vehicle.

In one example, the one or more processors are also configured to use output from the plurality of microphones to estimate a range of the emergency vehicle and wherein determining how to respond to the emergency vehicle is further based on the estimated range. In another example, the one or more processors are further configured to use output from the plurality of microphones to estimating a velocity of the emergency vehicle and wherein determining how to respond to the emergency vehicle is further based on the estimated relative velocity. In another example, the system also includes the vehicle.

BRIEF DESCRIPTION OF THE DRAWINGS

FIGS. 3A-3D are example external views of a vehicle in accordance with aspects of the disclosure.

DETAILED DESCRIPTION

Overview

Figure 1:
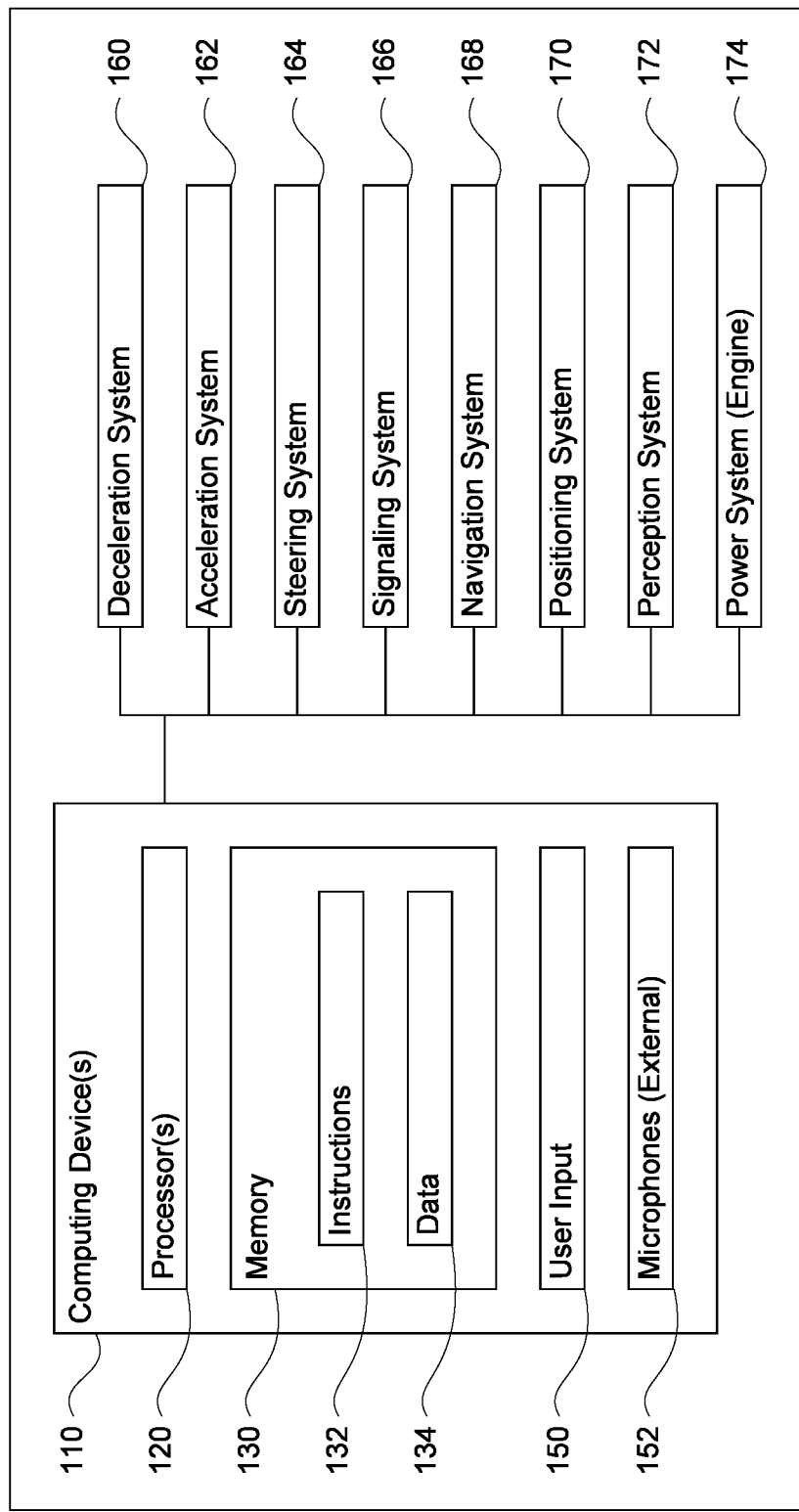
FIG. 1 is a functional diagram of an example vehicle in accordance with aspects of the disclosure.

The technology relates to autonomous vehicles for transporting people and/or cargo between locations. In order to address the situations described above, in addition to the perception system which uses lasers, radar, sonar, cameras or other sensors to detect objects in the environment, the autonomous vehicle may be equipped with a series of microphones or microphone arrays arranged at different locations on the vehicle. These microphones may be used, as discussed below to detect and identify emergency vehicles providing a way to gain awareness and react to an emergency vehicle when it is occluded or not visible to the vehicle's perception system as well as an independent and/or redundant way to detect an emergency vehicle when the emergency vehicle is visible or detectable by the vehicle's perception system.

The output of these microphones may be input into a model in order to detect potential emergency vehicle sirens. Once a siren noise is detected by the model, the timing of the siren noise reaching each of the microphones may be used as input to a second model in order to provide measurements as to a likely bearing, or relative direction, of the source of the siren, or rather a probability distribution over possible bearings. In addition, the siren noise, amplitude, and timing may be input into a third model to provide a probability distribution over possible ranges of the source of the siren. A fourth model may be used to estimate a probability distribution over possible velocities of the source of the siren noise.

The information from the models may be provided to one or more computing devices of the vehicle. These computing devices may use the estimated bearing, estimated range, and estimated relative velocity to determine how the vehicle should react to the vehicle. However, to increase the usefulness of the response, the information provided by the models may be compared to objects detected in the vehicle's environment to determine whether any of those objects are the source of the siren noise. Once a particular vehicle is identified as the source of the siren noise, the vehicle may be identified as an emergency vehicle. At this point, the observed movements of this emergency vehicle may also be considered when determining how best to respond to the emergency vehicle, thereby further improving the usefulness of the response.

In addition to comparing the model output to information from the perception system, the estimated bearing, estimated range, and estimated relative velocity may be compared to map information describing roadway features in the vehicle's environment. This may be used to identify a likely roadway, road segment or, in some cases, even a specific lane in which the emergency vehicle is traveling, again, even where the source is out of the range of the vehicle's perception system or otherwise occluded. The location of the vehicle relative to the emergency vehicle (and vice versa) may be a significant factor in determining what type of response is appropriate.

The features described herein may allow an autonomous vehicle to detect, identify, and respond to emergency vehicles even when those emergency vehicles are not readily detectable by the vehicle's perception system. When a siren sound is detected, the use of multiple locations for the microphones may allow the vehicle's computers to not only detect a siren, but also to estimate a relative direction, heading and velocity of the source of the siren. This may provide the computing devices of the vehicle with critical information for determining how to react to the siren noise. In addition, the comparison of the direction, heading and velocity of the source of the siren to identified vehicles and map information may allow the computing devices to further improve the response of the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes a series of microphones 152 or microphone arrays arranged at different locations on the vehicle. As shown, microphone arrays are depicted as separate from the perception system 172 and incorporated into the computing system 110. However all or some of microphones 152 may be incorporated into the perception system 172 or may be configured as a separate system. In this regard, the microphones may be considered independent computing devices operated via a microcontroller which sends signals to the computing devices 110.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing devices 110, in actuality, these systems may also be incorporated into computing devices 110, again as an autonomous driving computing system for controlling vehicle 100.

The computing devices 110 may control the direction and speed of the vehicle by controlling various components. By way of example, computing devices 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 2:
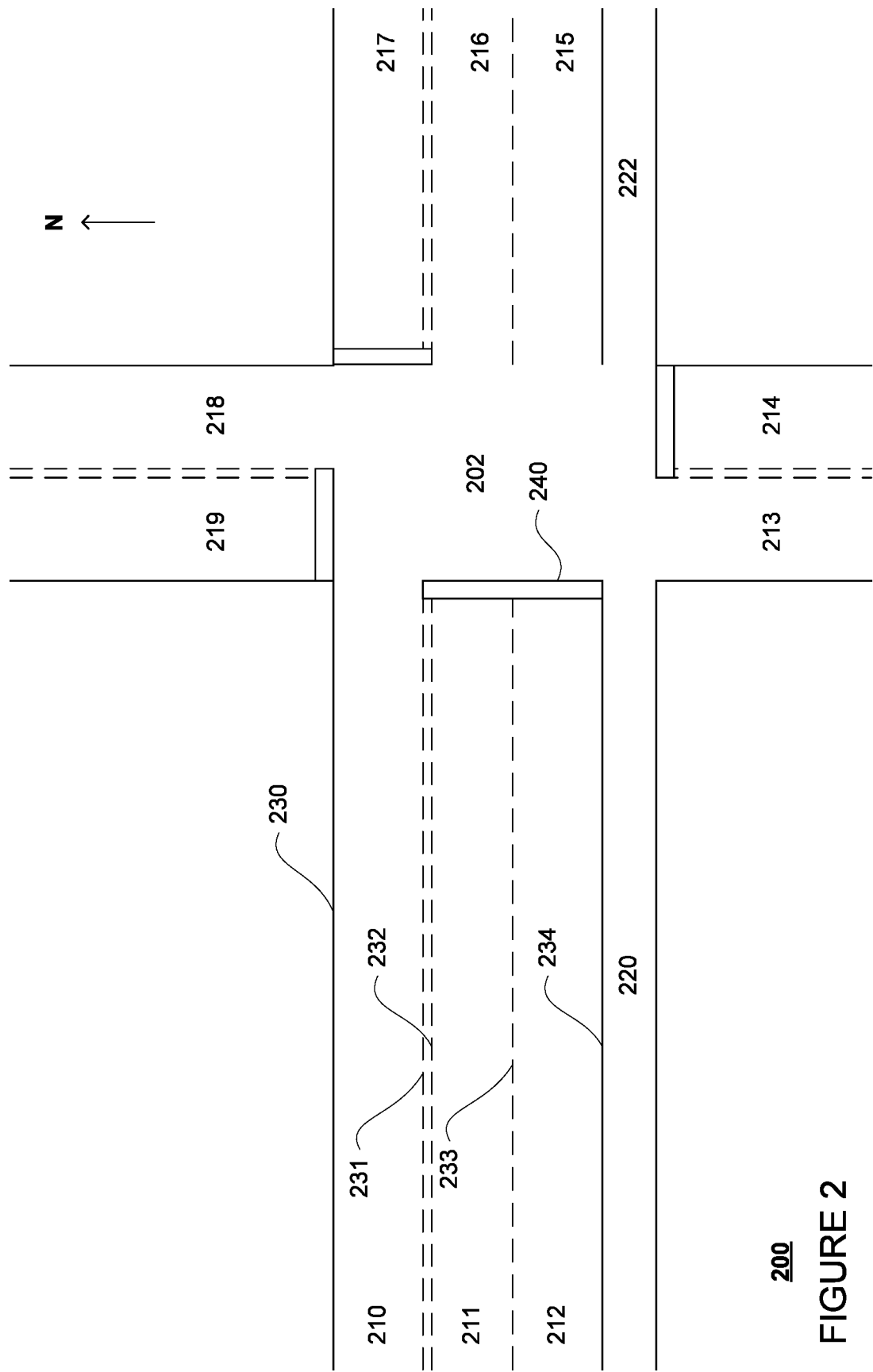
FIG. 2 is an example representation of map information in accordance with aspects of the disclosure.
Figure 3A:
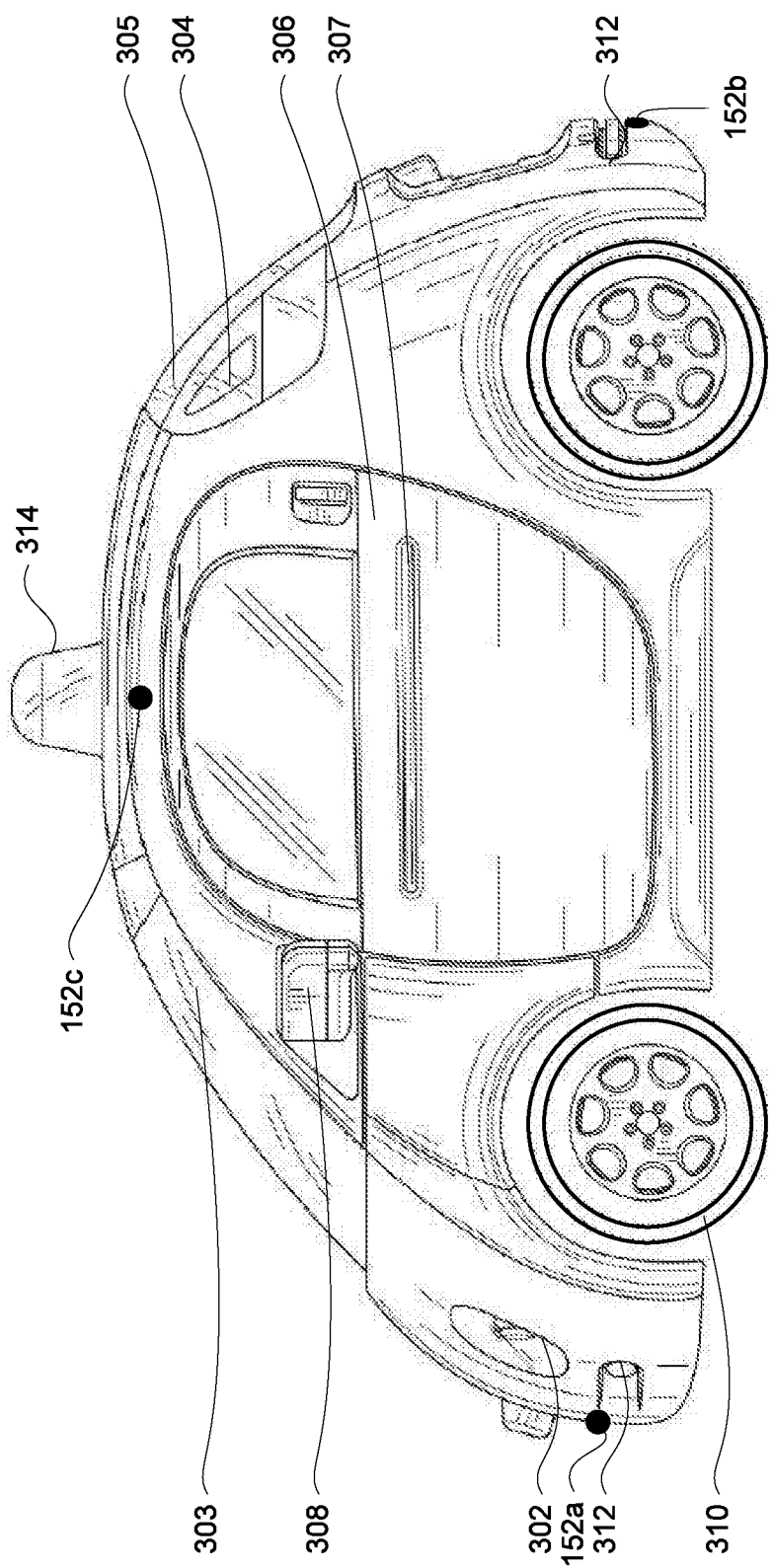
Figure 3D:
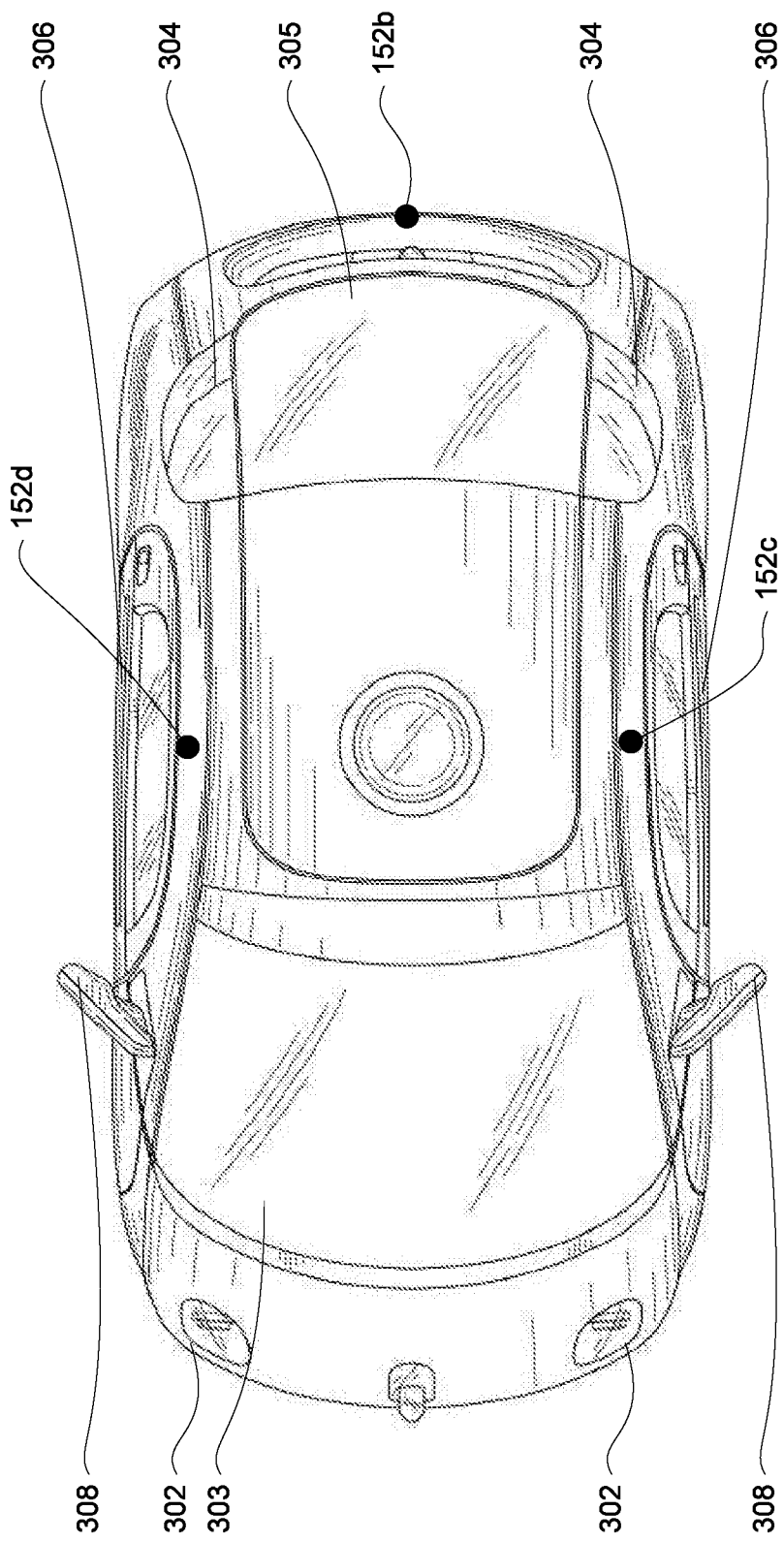

FIG. 2 is an example of map information 200 for a section of roadway. The map information 200 includes information identifying the shape, location, and other characteristics of various road features proximate to intersection 202. In this example, the map information 200 information defining the shape and location of lanes 210-219 as well as shoulder areas 220 and 222. In this example, the map information 200 includes information identifying lane lines 230-234 which define the lanes 210-212 as well as shoulder area 220. Lanes 211, 212, 215 and 216 have the same direction of traffic flow (in an eastward direction), while lanes 210 and 217 have a different traffic flow (in a westward direction). Lanes 219 and 213 have a southward direction of traffic flow, and lanes 214 and 218 have a northward traffic flow. In addition, when a vehicle is traveling in lanes 211 and 212, solid line (white bar) 240 may be used to define a bound of intersection 202 and/or a location at which a vehicle which does not currently have a right of way to pass through intersection from lane 211 or 212 must stop before proceeding. All this information may be included in the map information 200 for the area proximate to intersection 202.

The map information may identify lanes or portions of lanes as individual road segments which connect together in a grid or roadgraph. In this regard, given the simple nature of each of lanes 211-219, in this example, each of these "lanes" as shown in FIG. 2 may be considered a road segment. Of course, the road segments of the map information may actually be much smaller, for instance on the order of a few meters or more or less.

Although the example of map information 200 includes only a few road features, for instance, lane lines, shoulder areas, an intersection, and lanes and orientations, map information 200 may also identify various other road features such as traffic signal lights, crosswalks, sidewalks, stop signs, yield signs, speed limit signs, road signs, etc. Although not shown, the map information may also include information identifying speed limits and other legal traffic requirements, such as which vehicle has the right of way given the location of stop signs or state of traffic signals, etc.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. Housing 314 may house one or more sensors, such as LIDAR sensors, sonar devices, radar units, cameras, etc. of the perception system 172, though such sensors may also be incorporated into other areas of the vehicle as well.

FIGS. 3A-3D also include microphones 152 (or 152a-152d) arranged at different locations on the vehicle. These microphones may be considered "passive microphones" in that the microphones do not need to include an emitter (such as those used in sonar devices). In use, the actual spacing of the microphones should be reasonably close to expected wavelengths of siren noises for the area (for instance, as different states and countries may use different siren noises) to avoid spatial aliasing or ambiguity. In this regard, given such frequencies, the microphones may be located for example, on the order of ½ wavelength, apart from one another, in order to be able to compute direction from the relative phase of the sound waves that reach each microphone or rather the time difference of arrival. For instance, for emergency vehicles in California, a 6 cm distance may be appropriate. This relatively-small spacing may be achieved within a single set of microphones or microphone array, such as microphones 152a, arranged at the front end of the vehicle 100. In that regard, as noted above, microphones 152 (including 152a-152d) may actually include sets of microphones or microphone arrays. However, because microphones are directional, in other words an array on the front end of a vehicle does not hear sounds behind the vehicle well, more than one set of microphones or array may be used. In this regard a second set of microphones 152b may be located at the rear of the vehicle 100. Additional microphone arrays, such as microphones 152c and 152d, oriented away from the sides of the vehicle (left and right) may also be used.

Although not shown in the FIGURES, in addition or alternatively, microphone arrays may be placed microphones around a roof panel of a vehicle, such as around the circumference of the housing 314 (depicted here as a dome). This may achieve both goals (arrays of closely spaced microphones oriented towards different directions relative to the vehicle) simultaneously, but the microphone arrays would have to be placed in order to limit occlusion of sensors within the dome.

The instructions 132 may include a plurality of models for estimating characteristics of siren noises. A first model may be configured to detect siren noise from any sounds received at the microphones. For instance, the output of the microphones may be input into the first model in order to identify whether or not the output of the microphones includes a siren noise. In this regard, the first model may include a model which provides a likelihood of the output of the microphone including a siren noise for different types of noise.

The instructions 132 may also include a second model that can be used to estimate a bearing of a siren noise. For instance, the timing of the siren noise reaching each of the microphones may be measured to provide measurements as to a likely bearing, or relative direction, of the source of the siren, or rather a probability distribution over possible bearings.

The instructions 132 may also include a third model. This third model may use the microphone output, previously determined to include siren noise by the first model, as well as timing and amplitudes of the siren noise as input. With regard to the amplitudes, the presence and intensity of higher-frequency harmonies of a siren may also provide some indication of range, since the frequencies drop off at different rates. In some examples, the model may also use the estimated bearing and estimated range as input. In this regard, the third model may include a model which uses all or some the aforementioned inputs to provide a probability distribution over possible ranges (distances) of the source of the siren.

The instructions 132 may also include a fourth model. This fourth model may use the siren noise and timing collected over time to estimate a probability distribution over possible relative velocities of the source of the siren noise. For instance, using the change in bearing over time may provide an estimate of the relative velocity. In addition or alternatively, the model may include a neural net trained to predict likelihood over relative velocities from a snippet of the siren sound. This snipped may be, such as 0.5 second, 1.0 second, 2.0 seconds, 3.0 seconds, 4.0 seconds or more or less. The net may be able to extract relative velocity from the change in amplitude as well as changes in the harmonics, and in some cases, from Doppler shifts of the siren frequencies.

One or more of the models described above may include learned models, for instance, those that utilize machine learning, such as classifiers. For instance, one or more classifiers may be used to detect the siren noise, estimate a bearing, estimate a range, and estimate a relative velocity. In other examples, rather than using all or some classifiers, the models may include one or more neural nets, such as those discussed above to estimate relative velocities, or trackers, such as a Kalman filter or those that take in estimated bearings and estimated ranges, and/or corresponding probability distributions, over time, and output other state estimates, such as estimated relative velocities. In still other examples, estimated bearings may be determined using various algorithms such as a generalized cross correlation phase transform. In another example, estimated range may be computed analytically from the amplitude of the pressure sensed by the microphones because using the knowledge a range of siren volumes at a fixed distance and that pressure falls off like 1/range.

Moreover, the examples described herein utilize four separate models, however, the models may be implemented as a single classifier to detect a siren noise, estimate a bearing, estimate a range, and estimate a relative velocity, or a plurality of models. For instance, a first model may detect a siren, and a second model may be used to estimate a bearing, estimate a range, and estimate a relative velocity. In another instance, a first model may detect a siren, a second model may be used to estimate a bearing and estimate a range, and a third model may be used to estimate a relative velocity.

Where needed to set up some of the models, some measure of ground truth data may be extracted from a large set of logs. This may include, for instance, manually labeled instances of real siren noises and no sirens as well as manually labeled or verified examples of which vehicle is generating the siren etc. At least some aspects of this labeling can be automated using visual detection, such as by systems that utilize templates or image matching to identify particular types of objects from camera images or laser point clouds. For instance, if there is a label that a siren is present at time T, and at the same time the visual detection identifies one and only one vehicle as being an emergency vehicle with flashing lights, using an assumption that the vehicle was the source of the siren, the details of the vehicle, position, velocity, etc. over time, may be used to label the siren's relative and/or absolute position, velocity, etc. over time.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
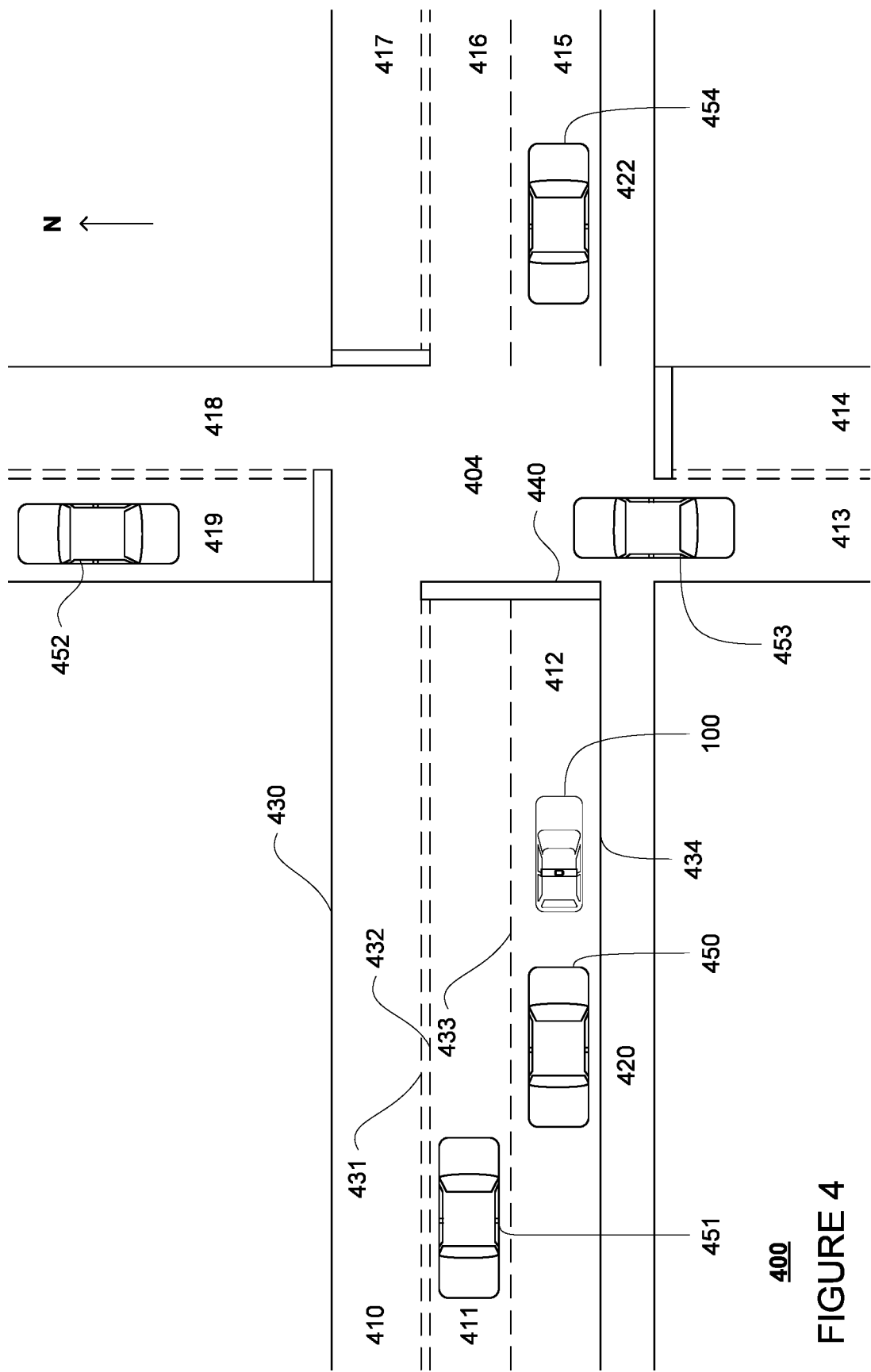
FIG. 4 is an example view of a section of roadway corresponding to the map information of FIG. 2 in accordance with aspects of the disclosure.

As noted above, computing devices 110 may control the movement of vehicle 100 though its environment. FIG. 4 is an example of vehicle 100 maneuvering on a portion of roadway 400 corresponding to the area of map information 200. In this regard, intersection 402 corresponds to intersection 202, lanes 410-419 correspond to lanes 210-219, shoulder areas 420 and 422 correspond to shoulder areas 220 and 222, lane lines 430-434 correspond to lane lines 230-234, and solid line 440 corresponds to solid line 240. Thus, in this example, vehicle 100 is approaching intersection 402 from lane 412 on a trajectory that will take vehicle 100 into intersection 404 to proceed towards lane 415 or alternatively, to make a right turn into lane 413.

In this example, the vehicle's perception system 172 may provide the computing devices 110 with information about the vehicle's environment. This may include the location of objects such as lane lines 430-434 and solid line 440, which have a corresponding feature in the map information 200, as well as objects such as vehicles 451-454. The characteristics of these different objects, including their shape, location, heading, velocity, etc. may be provided by the perception system 172 to the computing devices 110.

As the vehicle moves around, the output of the microphones 152 may be fed into the first model order to detect potential emergency vehicle sirens. This may be done by the computing devices 110 or one or more computing devices of the perception system 172. Once a siren noise is detected by the first model, further processing may be performed to determine additional characteristics of the source of the siren noise.

For instance, the timing of the siren noise reaching each of the microphones 152 may be measured and input into the second model to provide measurements as to a likely bearing, or relative direction, of the source of the siren, or rather a probability distribution over possible bearings. For instance, the microphones 152 may be time synchronized in order to provide an estimated bearing of the source or what direction the siren is coming from relative to the vehicle. This may include a probability of the siren noise emanating from a plurality of different directions around the vehicle (i.e. from 0 to 360 degrees around the vehicle). The direction or range of directions, for instance a 5 degree or more or less range, with the highest probability may be considered to be an estimated bearing for the source of the siren noise. In addition or alternatively, the relative amplitude of the siren noise can be used as an indication of bearing of a source of a siren noise. For example, a siren in front of the vehicle, may sound louder at microphones 152a arranged at the front of the vehicle than at microphones 152b arranged at the rear of the vehicle.

Figure 5:
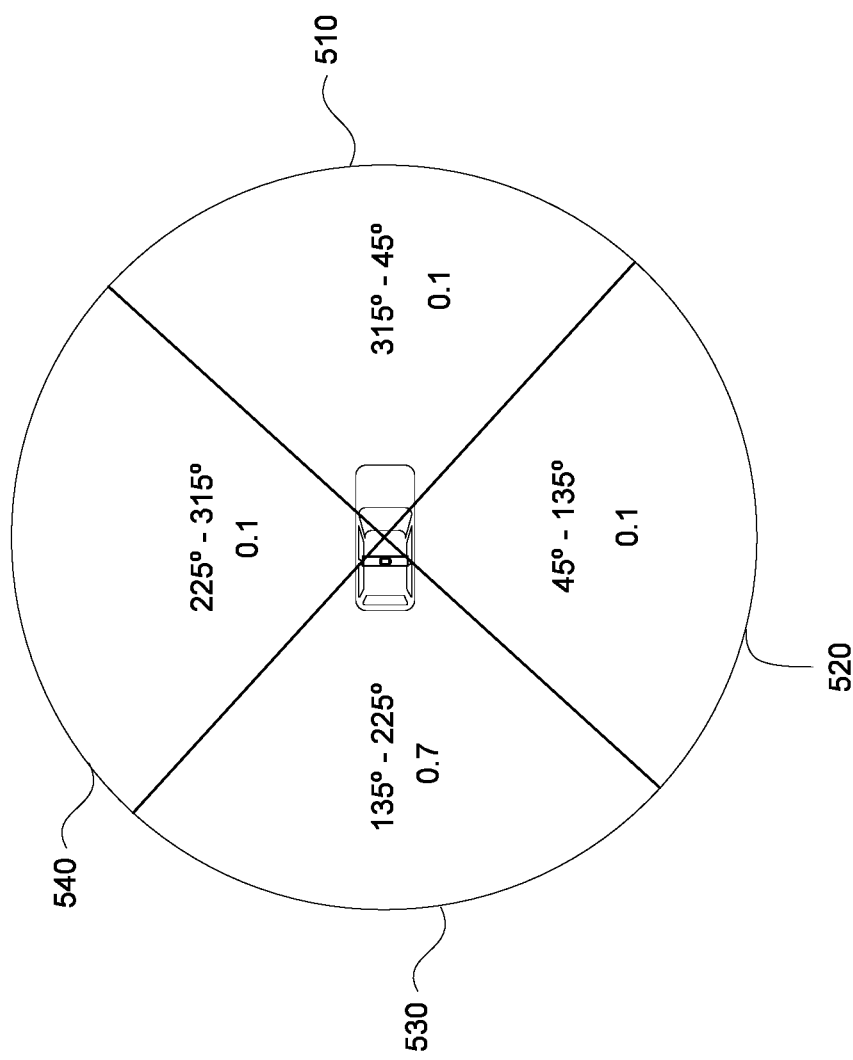
FIG. 5 is an example representation of bearing data in accordance with aspects of the disclosure.

FIG. 5 provides an example representation 500 of bearing data for a siren noise determined using the timing as described above. For different bearings within a 360 degree radius around the vehicle, the bearing data may include a probability or likelihood value. In this example, the bearings are shown across ranges of 90 degrees represented by bearing ranges 510, 520, 530 and 540. Each of these bearing ranges represents a different relative direction around the vehicle: front (bearing range 510), left side (bearing range 540), rear (bearing range 530), and right side (bearing range 520). Of course, larger or smaller ranges may also be used, such as 180, 45 degrees, degrees, 30 degrees, 15 degrees, 10 degrees, 1 degree, 0.5 degree, and so on. The likelihood values may range on a scale of 0 to 1, 0 being less likely and 1 being more likely to represent a bearing of the source of the siren noise. In this example, bearing range 510 has a 0.10 likelihood value, bearing range 520 has a 0.1 likelihood value, bearing range 530 has a 0.7 likelihood value, and bearing range 540 has a 0.1 likelihood value. Thus, in this example, bearing range 530, having the highest likelihood value may be selected or identified as an estimated bearing for the source of the siren noise. In that regard, the source of the siren noise, at least in the example representation 500, is likely located behind vehicle 100.

In addition, the siren noise and timing may be input into the third model to provide a probability distribution over possible ranges (or distances from the vehicle) of the source of the siren. Again, this may be done by the computing devices 110 or one or more computing devices of the perception system 172. For instance, the timing for several seconds of output, such as 0.1 second, 1.0 second, 2.0 seconds, 3.0 seconds, 4.0 seconds or more or less, from the microphones may be used to estimate a range of the source of the siren noise relative to the vehicle for a plurality of different ranges. Filtering this information over time may provide an improved estimated range. The range or a range of distances, such as 0.25 miles or more or less, across a plurality of different ranges, may be identified as an estimated range for the source of the siren noise.

Figure 6:
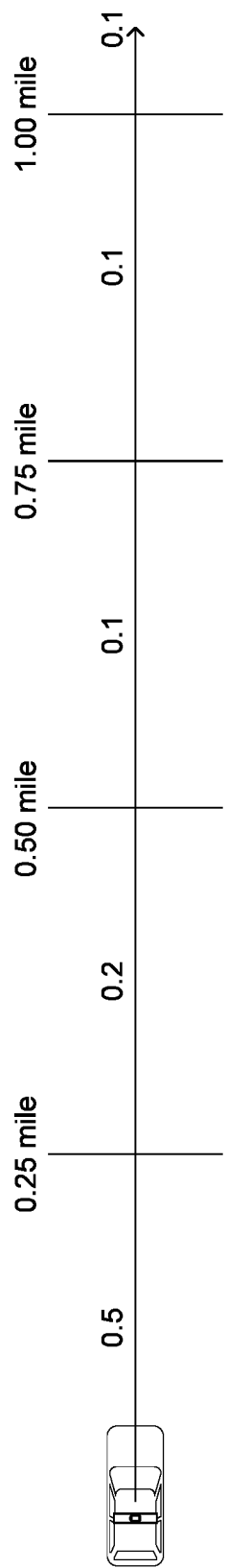
FIG. 6 is an example representation of range data in accordance with aspects of the disclosure.

FIG. 6 provides an example representation 600 of range (distance) data for a siren noise determined using the second model as described above. For different ranges, or really ranges of distances, from the vehicle, the range data may include a likelihood value. In this example, the distances are shown across ranges of 0.25 mile represented by ranges 0-0.25 mile, 0.25-0.50 mile, 0.50-0.75 mile, 0.75-1.00 mile, 1.00 mile or more. As noted above, the size of these ranges may be greater or smaller (0.01 mile or 0.5 mile), defined in other scales (such as meters), and so on. In addition, although the ranges in the example of FIG. 6 extend to 1 mile or more, and the "top end" of a range of distances may be somewhat smaller, for instance 0.2 to 0.25 mile, depending upon the sensitivity of the microphone and accuracy achievable by the third model. In still other examples, the ranges may continue well beyond 1 mile, for instance to 2, 5, 10, or more miles away from the vehicle.

Although depicted in FIG. 6 as being from the front of the vehicle, the distances may be in any direction, including for instance the direction (or range of directions) for the estimated bearing. Again, the likelihood values may range on a scale of 0 to 1, 0 being less likely and 1 being more likely to represent a distance of the source of the siren noise. In this example, range 0-0.25 mile has a 0.5 likelihood value, range 0.25-0.50 mile has a 0.2 likelihood value, range 0.50-0.75 mile has a 0.1 likelihood value, range 0.75-1.00 mile has a 0.1 likelihood value, and range 1.00 mile or more has a 0.1 likelihood value. Thus, in this example, range 0-0.25 mile, having the highest likelihood value may be selected or identified as an estimated range for the source of the siren noise. In that regard, the source of the siren noise, at least in the example representation 600, is likely located with 0.25 miles of vehicle 100.

In other examples, rather than providing likelihood values for ranges of distances, the third model may output an estimated range as a range of distances that meets a threshold likelihood or confidence value. For example, the third model may provide a range of distances that that corresponds to at least a 0.95 (or 95%) likelihood, or more or less, of the source of the siren noise being within that range of distances. For instance, for a source siren noise that is very nearby the vehicle, the range of distances may be on the order of 0 to 50 meters from the vehicle or more or less. For a source of a siren noise that is fairly distant from the vehicle, the range may be, e.g., 100 to 400 meters from the vehicle or more or less. Because the pressure from sound waves of a siren noise hitting the microphones 152 drops off approximately by a rate of the inverse of the distance from the microphones 152 to the source of the siren noise (or 1/range), the range of distances which meet the threshold likelihood value (or confidence) will likely be smaller when the source of the siren noise is closer to the vehicle and larger when the source of the siren noise is farther away from the vehicle.

These range estimates may be fairly inaccurate, with relatively large errors, for instance on the order of 1.5X to 2X (where X represents an estimated range or distance). However, despite these large errors, the estimated range may assist the vehicle's computing devices to determine if the source of a siren noise is too far away to react to (on the order of a quarter of mile or more). At the same time, the second model may also provide an estimate of the range rate, or how fast the siren noise is getting louder or softer. This may assist the computing devices 110 in determining whether the source of the siren noise is getting closer or farther (towards or away estimate) which can be used to determine how to respond to the emergency vehicle. In the example of FIG. 6, the towards or away estimate may indicate that the emergency vehicle is moving towards the vehicle 100.

The fourth model may also be used to estimate a probability distribution over possible relative velocities of the source of the siren noise using the siren noise and timing collected over time. In some examples, initial estimate may be compared to the map information in order to refine the estimate, for instance based on map constraints (such as speed limits, etc.). Again, may be done by the computing devices 110 or one or more computing devices of the perception system 172. By filtering this information over time may provide an estimated relative and/or absolute velocity of the source of the siren noise.

Figure 7:
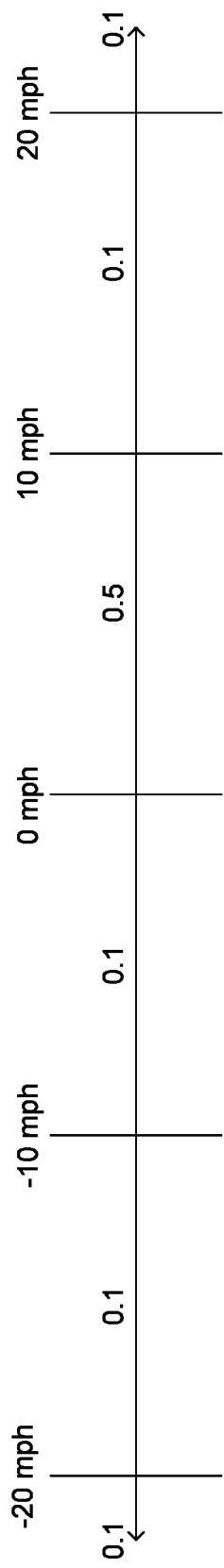
FIG. 7 is an example representation of relative velocity data in accordance with aspects of the disclosure.

FIG. 7 provides an example representation 700 of relative velocity data for a siren noise determined using the third model as described above. For different velocities, or really ranges of velocities relative to the vehicle, the relative velocity data may include a likelihood value. In this example, the velocities are shown across ranges of 10 miles per hour relative to the vehicle represented by ranges less than −20 mph, −20--10 mph, −10-0 mph, 0-10 mph, 10-20 mph, and greater than 20 mph. Of course, additional ranges (20-30, −20--30, 6 and so on) as well as larger (20 mph) or smaller (1 mph) ranges may also be used. Moreover, as shown in the example of FIG. 7, the ranges may even include negative values to indicate that the source of the siren noise is moving away from the vehicle and positive values to indicate that the source of the siren noise is moving towards the vehicle.

Again, the likelihood values may range on a scale of 0 to 1, 0 being less likely and 1 being more likely to represent a velocity of the source of the siren noise. In this example, range −20 or less has a 0.1 likelihood value, range −20--10 mph has a 0.1 likelihood value, range 0-10 mph mile has a 0.5 likelihood value, range 10-20 mph has a 0.1 likelihood value, an range 1 greater than 20 mph has a 0.1 likelihood value. Thus, in this example, the relative velocity, having the highest likelihood value may be selected or identified as an estimated relative velocity for the source of the siren noise. In that regard, the source of the siren noise, at least in the example representation 700, is likely to be traveling at 0-10 mph relative to vehicle 100 and towards vehicle 100 (as opposed to away or negative), or very close to the same speed as vehicle 100.

In some examples, the first model may be used to identify exactly what part of the sound received at the microphone corresponds to a siren noise. In other words, the first model may be used to identify what small range of frequencies versus time correspond to a siren noise. This can reduce the amount of information fed to the second, third and fourth models which is unrelated to the siren noise (i.e. interference from sounds like wind noise or noise from nearby vehicles).

The information from the models as well as any of the estimated characteristics may be provided to the one or more computing devices 110. These computing devices may use the bearing data, range data, relative velocity data, estimated bearing, estimated range, towards or away estimate, and estimated relative velocity to determine how the vehicle should react to the vehicle. Combining the examples of FIGS. 5-7, the computing devices may determine that the source of the siren noise is located towards the rear of vehicle 100 (within bearing range 530), located at a range of 0-0.25 miles away from the vehicle 100, and traveling at 0-10 mph relative to vehicle 100 "towards" (approaching) vehicle 100. However, to increase the usefulness of the response, the information provided by the models may be compared to objects detected in the vehicle's environment to determine whether any of those objects are the source of the siren noise.

For instance, as noted above, the perception system may detect and identify objects within the range of the sensors of the perception system. Over time, the perception system may also determine characteristics of those objects, such as which of the objects are vehicles as well as the heading, location, and relative velocity of each object. This information may be compared with the estimated bearing, estimated range, and estimated relative velocity for the source of the siren noise in order to identify which if any detected vehicles may be the source of the siren noise. This may be done iteratively for every identified vehicle in order to produce a likelihood that it is the source of the siren noise. At the same time, the computing devices may produce a likelihood that every identified vehicle is not producing the siren. This may be an important value where the emergency vehicle is out of the range or otherwise occluded.

Returning to the example of FIG. 4, comparing the estimated characteristics of the source of the siren noise with the objects identified as vehicles as detected and determined by the perception system 172, the computing devices 110 may estimate a likelihood of each of the detected vehicles being the source of the siren noise. For instance, the computing devices 110 may iterate through all of the identified vehicles 450-454 and determine a likelihood value based on the estimates that the source of the siren noise is located towards the rear of vehicle 100 (within bearing range 530), located at a range of 0-0.25 miles away from the vehicle 100, and traveling at 0-10 mph relative to vehicle 100. The likelihood value of other vehicles in front of the vehicle 100, or vehicles 452-454 is relatively low, for instance 0.1 or more or less, since the source of the siren noise is located towards the rear of vehicle 100. At the same time, the likelihood values of the vehicles towards the rear of vehicle 100, or vehicles 450 and 451, is relatively high, for instance 0.5 or more or less, given the estimated bearing. The likelihood values of vehicles 450 and 451 may also differ based on the estimated range and estimated relative velocity. For instance, the likelihood value of vehicle 450 may be higher than the likelihood value of vehicle 451, as vehicle 450 may be moving at a velocity that is within 10 mph of the velocity of vehicle 100 whereas the vehicle 451 may be traveling at a much higher relative velocity, such as 20 mph greater than the velocity of vehicle 100.

While the example above relies on the data selected to be the estimated bearing, estimated range, or estimated relative velocity, the likelihood values for the objects in the vehicle's environment may alternatively be determined not by the data selected to be the estimated bearing, estimated range, or estimated relative velocity, but rather all of the bearing data, range data, and relative velocity data.

In some examples, the siren noise may be detected (for instance, using the first model as discussed above), before the source of the siren noise is actually detected by the vehicle's detection system. In such cases, once an object detected by the perception system is then identified as the source of the siren noise, prior model output (such as estimated bearing, estimated range, and estimated relative velocity), can be used to hypothesize where the emergency vehicle was coming from, for instance using the map information as well as information about areas within range of the perception system which may have previously been occluded. This may be used to improve the estimate of which object or vehicle is the source (or is not the source) of the siren noise.

Once a particular vehicle is identified as the source of the siren noise, the vehicle may be identified as an emergency vehicle. At this point, the observed movements of this emergency vehicle may also be considered when determining how best to respond to the emergency vehicle, thereby further improving the usefulness of the response. Again, returning to the examples discussed above, given the likelihood values, the computing devices 110 may identify vehicle 450 as the source of the siren noise. In this regard, the computing devices 110 may observe the movement of the emergency vehicle 450 and use this information to determine how best to respond. Of course, in some examples, there may be no other vehicles detected by the perception system 172 or all of the other vehicles may have likelihood values that are too low or do not meet a minimum likelihood value threshold to be identified as an emergency vehicles. In such cases, the computing devices 110 may determine that the source of the emergency vehicle is simply not within range of the perception system 172 or is otherwise occluded, for instance, located behind an object such as another vehicle, structure, etc.

In the example, of FIG. 4, vehicle 100 may simply pull onto the shoulder area 420 and stop or slow down. Alternatively, if vehicle 100 is traveling too quickly to safely pull onto the shoulder area 420, or if the vehicle was going to make a right turn at the intersection 404, the vehicle may continue to make the right turn into lane 413 if doing so would not impede the movement of the emergency vehicle 450 (such as where it would be faster and safe to turn than pull over because the shoulder area is very narrow, occupied, or ends quickly). In another alternative, if the shoulder area 420 is already occupied, it may be safer for vehicle 100 to change from lane 412 to lane 411 and allow the emergency vehicle 450 to proceed passed vehicle 100 and into the intersection 404.

In addition to comparing the estimated characteristics to information from the perception system, these characteristics may be compared to map information describing roadway features in the vehicle's environment. This may be used to identify a likely roadway, road segment or, in some cases, even a specific lane in which the emergency vehicle is traveling, again, even where the source is out of the range or otherwise occluded. For instance, the vehicle's computing devices may be able to identify a road segment or segments ahead of the vehicle on the same road, a road segment or segments behind the vehicle on same road, road segment or road segments on a crossing street, and event road segment or segments on a road that does not intersect (or at least intersect nearby) the current trajectory of the vehicle. Identifying a road segment may include, for example, modeling probability over a plurality of roadways or road segments, not just identify the single most likely.

For instance, comparing the estimated bearing, estimated range, and estimated relative velocity to the example of FIG. 2, the computing devices 110 may determine that the source of the emergency vehicle is most likely to be located on the road segments corresponding to lanes 210, 211, and 212.

Using the map information may thus provide an even better estimate of how the vehicle should respond. Of course, if such map information is not available, using cues about whether the emergency vehicle is in front of or behind, to the left or right, or approaching or receding from the vehicle may also be useful.

In some instances, beamforming may be used to focus the microphones on listening on locations that are most relevant to emergency vehicles. This may be done before or after a siren is identified. For instance, the map information and information from the perception system may also be used to beamform the microphones to focus listening on locations that are most relevant to emergency vehicles. This may include, for example, roadways or near potential flashing light detections (as identified by the perception system or by using information from the perception system). At the same time, beamforming may be used to ignoring interfering sounds from other locations, such as tree rustling, wind noise, vibrations of the vehicle itself, nearby construction, etc. As an example, for each array of the microphones, one beam may be formed straight ahead, one offset 60 deg left, and one offset 60 deg right. The first model may be used on the sound produced from each formed beam. Beamforming can increase signal-to-noise ratio quite substantially, which should, for example, increase the detection range of the microphones. In addition, the beam in which the model gives the highest likelihood of including a siren may be used as an indication of the approximate bearing.

In addition, the output of the second model can be used to beamform the microphones in order to focus on each direction in which there was a peak in probability of the siren noise emanating from that direction. By doing so, the increased signal-to-noise ratio may provide a more accurate estimation of the bearing of the siren noise. This, in turn, may provide for more accurate estimates of range and velocity.

As noted above, this additional processing may be useful in a variety of circumstances. The location of the vehicle relative to the emergency vehicle (and vice versa) may be a significant factor in determining what type of response is appropriate. As such if the emergency vehicle is behind the vehicle, it may be most appropriate to pull over. In the emergency vehicle is oncoming or in front of and moving towards the vehicle, whether the vehicle should pull over or not depends on the physical surroundings, such as whether or not there is a median. Similarly, if the source of the siren is coming from the side (left or right) of the vehicle as the vehicle approaches an intersection, the best response may be to slow down dramatically or even stop before the intersection, even where the vehicle would otherwise be free to pass through the intersection, such as when a light is green or when cross traffic has a stop or yield sign. At the same time, if the sound is coming from a neighboring, or for instance parallel street, responding by changing behavior of the vehicle may not actually be appropriate.

Again, by having estimated characteristics of a source of a siren, the computing devices 110 may better control the reactive behavior of the vehicle 100. For instance, returning to FIG. 4, if vehicle 450 is identified as an emergency vehicle, the computing devices 110 may control vehicle 100 to immediately pull over onto shoulder area 420, change to lane 411, or make a right turn as discussed in the examples above. If vehicle 451 is identified as an emergency vehicle, the computing devices 110 may control vehicle 100 to continue on the current trajectory at the same or slower speed or to pull over onto shoulder area 420. If vehicle 452 is identified as an emergency vehicle, the computing devices 110 may control vehicle 100 to stop at solid line 440 and/or before the intersection 404, even where the vehicle 100 otherwise would have had the right of way to proceed through the intersection. As an example instance, vehicle 100 may have the right of way where vehicle 452 was subject to a stop sign and vehicle 100 was not or where vehicle 100 currently has a green light (go) for intersection 404 and vehicle 452 has a red line (stop) for intersection 404. If vehicle 453 is identified as an emergency vehicle, the computing devices 110 may control vehicle 100 to continue on the current trajectory at the same or slower speed. In this example, vehicle 100 should continue on the current trajectory as vehicle 453 has already crossed over the vehicle 100's trajectory. If vehicle 454 is identified as an emergency vehicle, the computing devices 110 may control vehicle 100 to continue on the current trajectory at the same or slower speed. In this case, slowing down and proceeding with caution may be an appropriate response wherein vehicle 100's trajectory follows vehicle 454, even though vehicle 454 is moving away from vehicle 100, as the likelihood of sudden stops by vehicle 454 (due to a likely emergency) may be relatively high. Of course, any number of additional maneuvers may be appropriate depending upon the current circumstances of vehicle 100.

If none of vehicles 450-454 are likely to be the source of the siren noise, or none of the other vehicles meet the minimum likelihood value threshold, again, the computing devices 110 may determine that the source of the emergency vehicle is simply not within range of the perception system 172 or is otherwise occluded, for instance, located behind an object such as another vehicle, structure, etc. Again, having estimated characteristics, even without identifying a specific detected vehicle as the source of the siren noise, may still provide the computing devices with useful information to determine how, if at all, to best respond to the siren noise. For instance, when an emergency vehicle is occluded, such as when there are other vehicles between the emergency vehicle and the vehicle, the computing devices are still able to recognize the siren to respond and pull over as needed.

In some cases, it can be difficult to resolve the bearing of the siren nose when there is another loud sound or interference (e.g. train, jack-hammer or other loud vehicle). When the interference is not being both at the same bearing and having high energy in the same frequencies as the siren, various techniques may be used to focus the detection of the siren noise. One technique may include using beamforming as discussed above. If the siren noise and interference are at different bearings, in a beam pointed at the siren, the siren noise will be much louder than the interference source compared to in data without beamforming. In addition or alternatively, the bearing information may be computed as a function of frequency and time. This bearing information, along with the amplitude information to the second model, so that the model can distinguish sounds that have similar frequency content, but different bearings. Again, in addition or alternatively, the bearing of a loud sound may be identified and classified using the first model. If the loud sound is not a siren (but rather, interference), a beam may be formed and used that passes sound except for the bearing of the interference.

Figure 8:
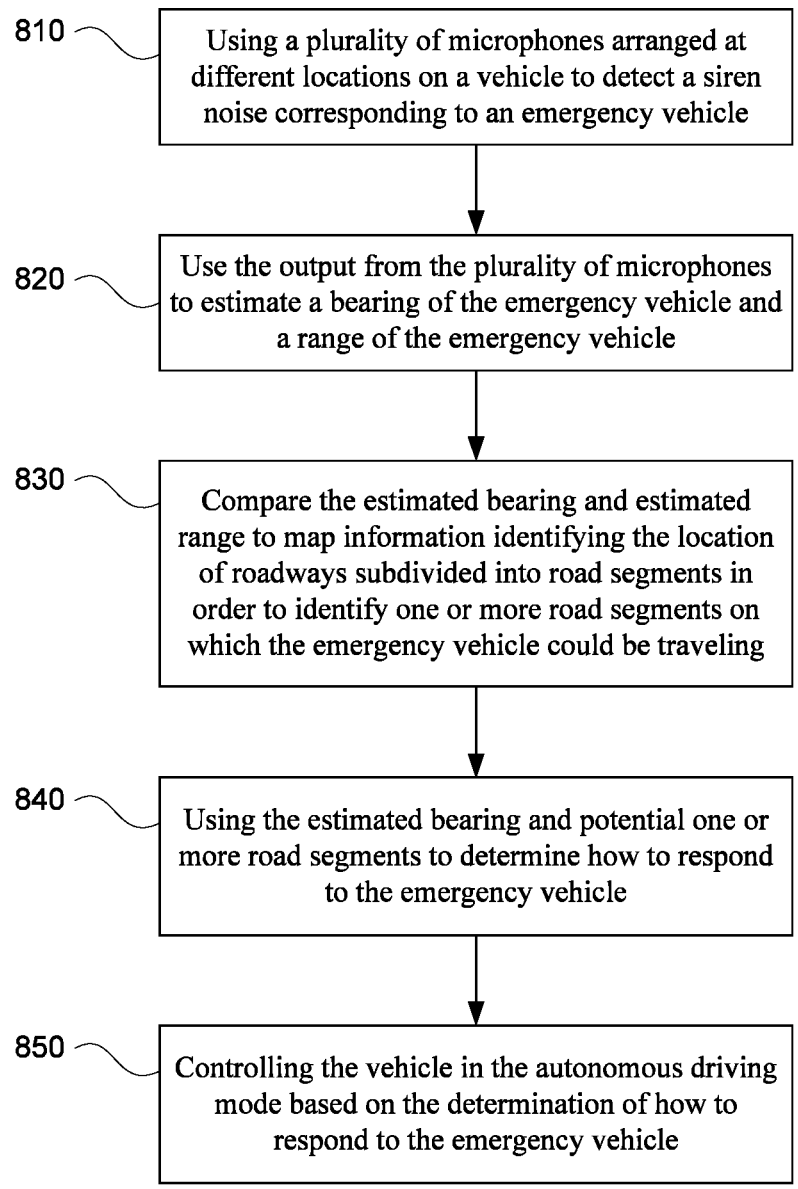
FIG. 8 is a flow diagram in accordance with aspects of the disclosure.

FIG. 8 is a flow diagram 800 that may be performed by one or more processors such as one or more processors 120 of computing devices 110 in order to detect and respond to emergency vehicles. In this example, at block 810, a plurality of microphones, such as microphones 152, arranged at different locations on a vehicle, such as vehicle 100, are used to detect a siren noise corresponding to an emergency vehicle. The output from the plurality of microphones is used to estimate a bearing of the emergency vehicle and a range of the emergency vehicle at block 820. The estimated bearing and estimate range are compared to map information identifying the location of roadways subdivided into road segments in order to identify one or more road segments which the emergency vehicle could be traveling at block 830. At block 840, the estimated bearing and potential one or more road segments are used to determine how to respond to the emergency vehicle. At block 850, the vehicle is controlled in an autonomous driving mode based on the determination of how to respond to the emergency vehicle.

As noted above, the operations described herein may be performed in different orders. For instance, estimated bearing and estimated range of sounds received at the microphones 152 as a function of time and frequency can be computed using the models (or other methods described above). These may then be fed into a model that actually detects or identifies the siren noise.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for detecting and responding to emergency vehicles, the method comprising:
   using, by one or more processors, a plurality of microphones arranged at different locations on a vehicle to detect siren noises corresponding to an emergency vehicle, the vehicle configured to operate in an autonomous driving mode;
   applying beamforming to focus the plurality of microphones on listening on a plurality of locations;
   evaluating focused signals received from the plurality of microphones;
   determining, by the one or more processors, that a given vehicle corresponds to the emergency vehicle based on the evaluated signals; and
   controlling, by the one or more processors, the vehicle in the autonomous driving mode based on determining that the given vehicle corresponds to the emergency vehicle.

2. The method of claim 1, wherein the plurality of locations is determined to be relevant to emergency vehicles.

3. The method of claim 1, wherein the beamforming is used to focus the plurality of microphones on listening on the plurality of locations before a siren noise is detected.

4. The method of claim 1, wherein the beamforming is used to focus the plurality of microphones on listening on the plurality of locations after a siren noise is detected.

5. The method of claim 1, wherein applying the beamforming includes evaluating map information to focus the plurality of microphones on listening on the plurality of locations.

6. The method of claim 1, wherein the beamforming is used for ignoring interfering sounds from one or more other locations.

7. The method of claim 6, wherein ignoring the interfering sounds include evaluating whether a siren noise and the interfering sounds are from different bearings.

8. The method of claim 7, wherein information from the different bearings is computed as a function of frequency and time.

9. The method of claim 1, further comprising applying a first model to sounds obtained from each beam, wherein the first model is configured to perform detecting of the siren noises.

10. The method of claim 9, further comprising applying a second model to estimate a bearing of the detected siren noises.

11. The method of claim 10, wherein applying the beamforming is performed based on output of the second model.

12. The method of claim 11, wherein applying the beamforming based on the output of the second model focuses on each direction in which there was a peak in probability of the detected siren noises emanating from that direction.

13. The method of claim 9, wherein the first model is configured to distinguish sounds that have similar frequency content but different bearings.

14. The method of claim 9, further comprising using the first model to identify what range of frequencies versus time correspond to the detected siren noises.

15. The method of claim 1, wherein the beamforming increases a sign-to-noise ratio and a detection range of the plurality of microphones.

16. A system for detecting and responding to emergency vehicles, the system comprising:
a plurality of microphones arranged at different locations on a vehicle to detect siren noises corresponding to an emergency vehicle; and
one or more processors configured to:
apply beamforming to focus the plurality of microphones on listening on a plurality of locations;
evaluate focused signals received from the plurality of microphones;
determine that a given vehicle corresponds to the emergency vehicle based on the evaluated signals; and
control the vehicle in an autonomous driving mode based on a determination that the given vehicle corresponds to the emergency vehicle.

17. The system of claim 16, further comprising the vehicle, and wherein the plurality of microphones are arranged in an array in which a first beam is formed straight ahead of the vehicle, a second beam is formed offset a predetermined amount of degrees to the left of the first beam, and a third beam is formed offset the predetermined amount of degrees to the right of the first beam.

18. The system of claim 16, wherein the one or more processors are further configured to apply a first model to sounds obtained from each beam, wherein the first model is configured to perform detection of the siren noises.

19. The system of claim 18, wherein the one or more processors are further configured to apply a second model to estimate a bearing of the detected siren noises.

20. The system of claim 19, wherein application of the beamforming is performed based on output of the second model.

* * * * *